(12) United States Patent
Kitson

(10) Patent No.: US 6,499,604 B1
(45) Date of Patent: Dec. 31, 2002

(54) COMPOUND INDUCTION SYSTEM

(75) Inventor: James E. Kitson, Frederick, MD (US)

(73) Assignee: Crisplant Inc., Frederick, MD (US)

(*) Notice: Subject to any disclaimer, the term of this patent is extended or adjusted under 35 U.S.C. 154(b) by 0 days.

(21) Appl. No.: 09/521,238

(22) Filed: Apr. 5, 2000

Related U.S. Application Data

(60) Provisional application No. 60/127,837, filed on Apr. 5, 1999.

(51) Int. Cl.$^7$ .............................. B07C 5/00; B65G 47/10
(52) U.S. Cl. ...................... 209/630; 209/942; 198/371.2
(58) Field of Search .................... 209/546, 583, 209/606, 917, 922, 942, 630; 198/371.1, 371.2, 371.3

(56) References Cited

U.S. PATENT DOCUMENTS

| | | | | |
|---|---|---|---|---|
| 2,572,325 A | * | 10/1951 | Ernst | 198/371.2 X |
| 3,010,160 A | * | 11/1961 | Lytton et al. | 198/371.2 X |
| 4,765,488 A | * | 8/1988 | Moriarity | 209/551 |
| 4,909,374 A | * | 3/1990 | Skrypalle | 198/371.3 |

FOREIGN PATENT DOCUMENTS

| | | | | |
|---|---|---|---|---|
| DE | 2225666 | * | 12/1973 | 198/371.2 |
| WO | 91/16251 | * | 10/1991 | 198/371.2 |

* cited by examiner

*Primary Examiner*—Tuan N. Nguyen
(74) *Attorney, Agent, or Firm*—Birch, Stewart, Kolasch & Birch, LLP

(57) ABSTRACT

The present invention relates to a compound induction system for feeding articles to a material handling system. This induction system includes an input station with a reversing buffer belt. Articles placed on this belt will be fed to one of at least two downstream feeding sections. From these feeding sections, the articles will be transported to a material handling system such as a tilt tray sorter. The present invention can avoid the need, as well as its associated additional product damage and higher labor costs, for presorting of articles.

4 Claims, 2 Drawing Sheets

COMPOUND INDUCTION SYSTEM

This application claims priority on provisional Application No. 60/127,837 filed on Apr. 5, 1999, the entire contents of which are hereby incorporated by reference.

BACKGROUND OF THE INVENTION

1. Field of the Invention

The present invention relates to a compound induction system for feeding articles. In particular the invention relates to an induction station which receives an article from an operator and which transports the article to one of at least two downstream conveyors or sorters.

2. Description of the Background Art

Various induction systems are known for introducing packages and other articles to a sorting system. Conventionally, such induction systems will only feed items in one direction to one sorter thereby increasing the number of induction stations. Conventional systems also require presort of items to one of multiple sorters prior to receipt at the induction station. This presorting adds to the sorting system costs and increases potential misfeeds of articles. Additionally, the increased handling leads to potential additional article damage. Also, labor cost due to the initial presorting and large number of induction stations can increase in conventional systems.

Conventionally, when items are fed to an induction system, presorting of the items will occur. Pickers will remove items from a warehouse and fill totes which are delivered to the different induction stations. Because a presort of items is required, totes are often only partially filled. Moreover, because initial presorting and delivery of the presorted items to the designated induction station are required, potential mishandling or misdelivery of the pre-picked products can occur. This leads to increased costs for the system and potential damage to the handled articles.

Accordingly, a need in the art exists for an improved induction system.

SUMMARY OF THE INVENTION

It is a primary object of the present invention to provide a compound induction system whereby articles can be introduced more efficiently into a material handling system.

It is a further object of the present invention to provide a compound induction system whereby articles can be officially introduced into sorters without the need for presorting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
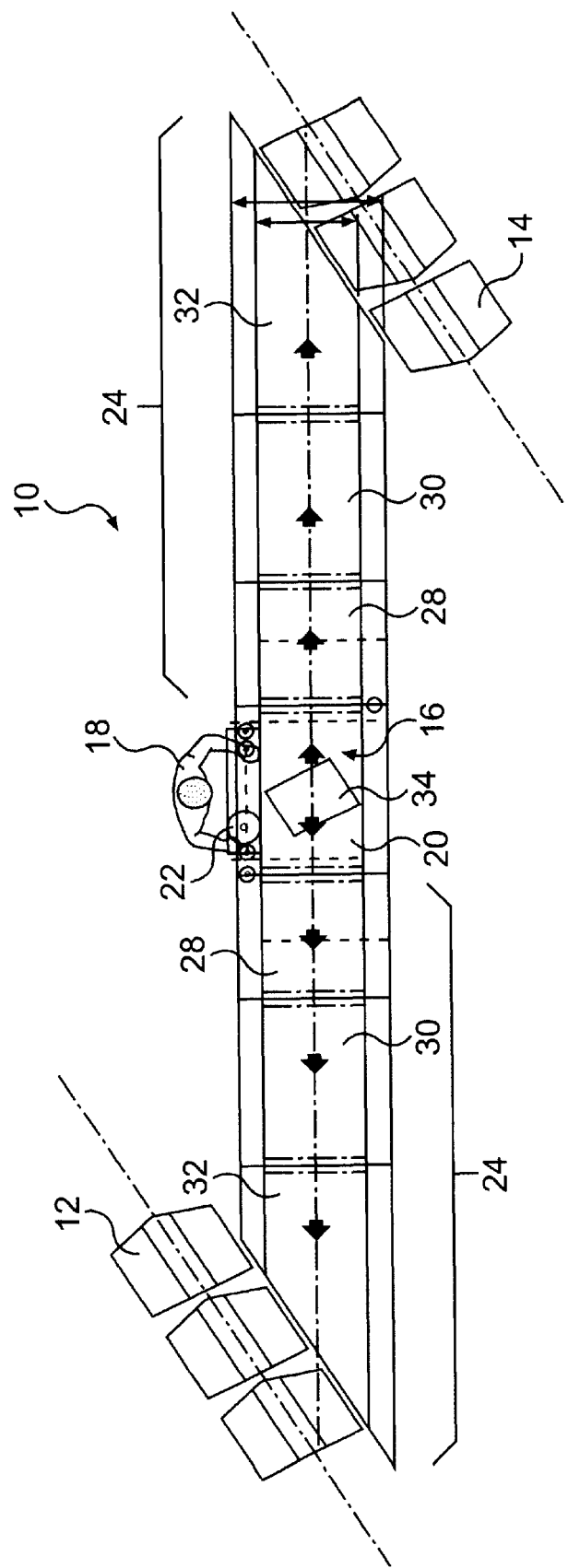
FIG. 1 is a plan view of the compound induction system of the present invention.

Referring in detail to the drawings and with particular reference to FIG. 1, a compound induction system 10 is shown. This induction system feeds articles to either sorter 12 or 14. The sorters 12 and 14 can be two different sorter loops or can be connected loops of the same sorter with two input points. These sorters 12, 14 can be tilt tray sorters, a conveyor arrangement or any other type of material handling system. Additionally with the use of diverters, more than two sorters or other output devices can be fed from the single input station 16. While the present invention is shown as being used with sorters 12 and 14, it should be appreciated that this induction system 10 can be used in many different materials handling applications. For example, this induction system can be used with a conveyor system or any other desired system.

The compound induction system 10 includes an input station 16. An operator 18 places items to be handled on a reversing buffer belt 20 in the input station 16. This conveyor belt 20 can move in two directions, either towards sorter 12 or 14. While a conveyor belt is shown which extends generally across the width of the input station 16, any type of reversing conveying arrangement could be used for the belt 20. For example, a plurality of belts, a plurality of powered rollers or any other suitable design could be had. In addition, if a plurality of belts or rollers is used, it is not necessary to have each of the belts or rollers powered.

The operator 18 receives items to be induced at station 16. A conveyor or other feed arrangement (not shown) can be provided for delivering these articles singularly, in unitized containers or in bulk to the operator 18. The operator 18 will take the articles and individually scan them with scanner 22. While scanner 22 is shown as being fixed on the forward side of input station 16, it is contemplated that this scanner could be detachable so that it can be moved by the operator to conveniently scan an article. The scanner 22 can also be located on the right-hand or left-hand side of the operator 18 or above the input station 16.

The articles are contemplated as having bar codes thereon or other means which the scanner 22 reads. The scanner 22 will inform the control system of what item is placed on the belt 20 of station input 16. Depending on where the control system determines each item needs to go, the control system will activate the belt 20 to move either in the right or left direction of FIG. 1. This will convey items onto the appropriate induction 24 for automatic transfer onto sorter 12 or 14.

Figure 2:
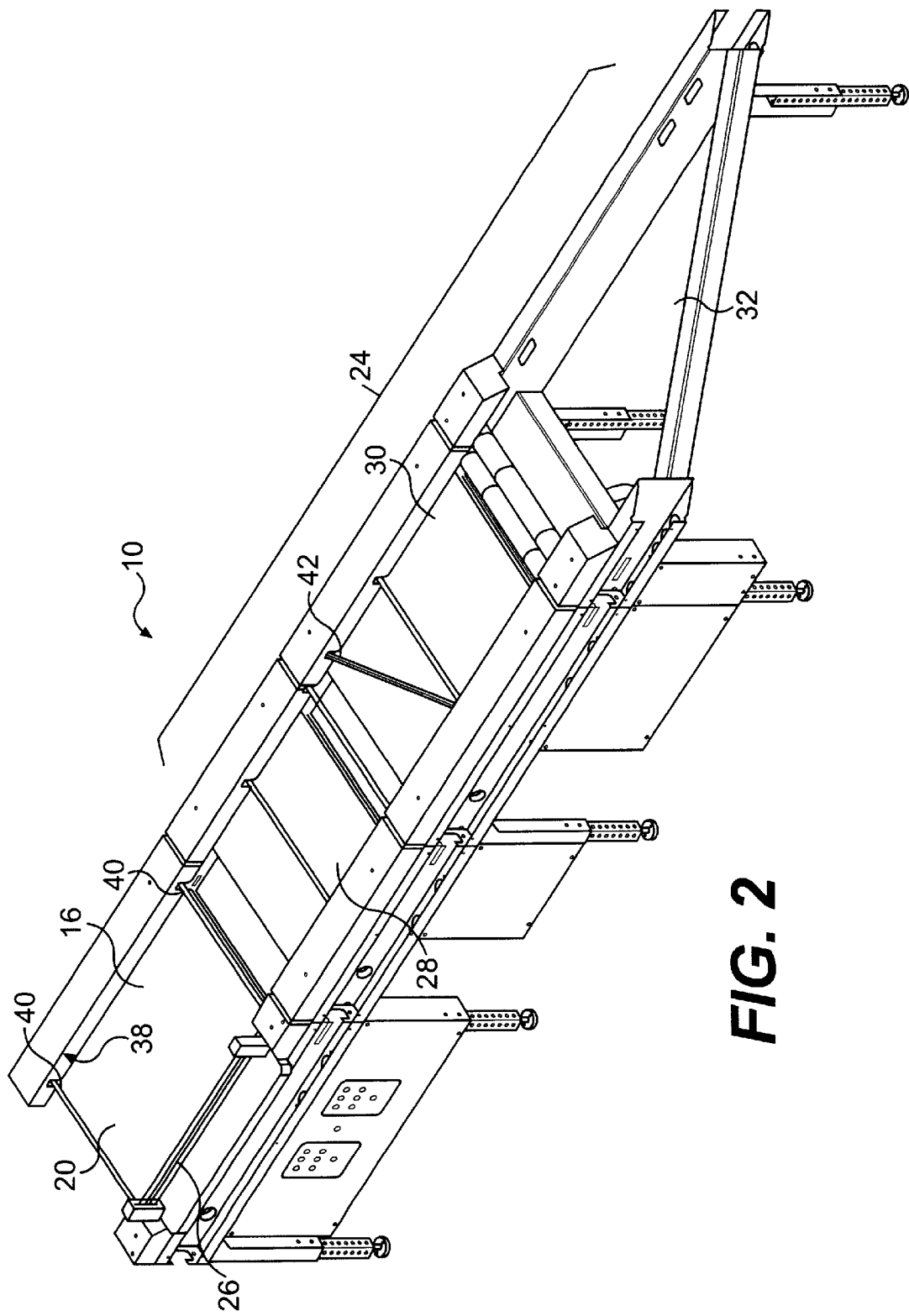
FIG. 2 is a perspective view of a portion of the induction system of the present invention.

Turning to FIG. 2, the input station 16 will now be described in more detail. The scanner 22 has been omitted from this input station 16 in FIG. 2 for simplicity. In addition, only one downstream feeding section 24 is shown in FIG. 2. With reference to FIG. 1, it should be appreciated that the opposite side of input station 16 also has such a downstream feeding station 24.

At the input station 16, a light screen 26 is provided at the side on which the operator 18 stands. When the operator 18 reaches over the input station 16 in order to place an article thereon, the light screen 26 will be broken. When the operator removes his or her hands and clears the input station 16, the light screen 26 will then be unbroken and a sensor can inform the control system that the item is ready to be transported. Thereafter, the reversing buffer belt 20 can be operated by the control system in the appropriate direction in order convey the article to one of the downstream induction sections 24 for automatic transfer onto sorter 12 or 14.

The light screen 26 can be formed from a plurality of lasers or photodetectors or any other suitable means. In fact, a single laser or photodetector can be used if it is placed such that the operator will break the beam. Also, instead of using a source which projects the light screen from side-to-side, a vertically arranged light source could be provided. For example, a photosensor and light source can be provided above and below the front of the input table 16.

Apart from using the light screen 26, a single button or plurality of buttons can be provided on the face of the input station 16. After the operator has placed the item on the reversing buffer belt 20, the operator can then simply push the button(s) in order to activate the system. The use of the light screen 26, however, frees the operator's hands. Therefore, the operator is capable of retrieving another item for handling while initial movement of the item placed on belt 20 can commence.

As seen in both FIGS. 1 and 2, each downstream induction section 24 includes a coding belt 28, an induction belt 30 and a transition belt 32. In FIG. 2, the convoyor belts have been omitted but the underlying structure is shown. Similarly to the reversing buffer belt 20, any or each of the belts 28, 30 and 32 could be replaced by a plurality of belts, powered roller, a pusher bar or other conventional conveyors for transporting the articles from the input station 16 to the sorter 12 or 14. In addition, any of the belt portions 28, 30, 32 could be omitted and articles moved directly from the reversing buffer belt 20 to the adjacent conveyor or sorter.

Because of the use of a plurality of belt sections 28, 30 and 32, more than one item can be held in the downstream induction section 24. When an item's designated position on the sorter 12 or 14 is adjacent the transition belt 32, articles will be conveyed automatically onto the sorter 12 or 14. Due to the speed of movement of the sorters 12 and 14, items can rapidly clear the downstream induction sections 24. Therefore, the compound induction system of the present invention can have a high throughput.

Because the sorters 12 and 14 are aligned at an angle relative to the input station 16, efficiency of the system can increased if the items are placed on the input station 16 in a particular orientation. In FIG. 1, item 34 is shown at an angled orientation. When this item is fed by reversing buffer belt 20 to either of the downstream induction sections 24, it will remain in this same angled orientation. Eventually, the transition belt 32 will feed the item 34 to one of the sorters 12 and 14. This item will generally maintain its orientation such that it will properly seat on the tray of the selected sorter. The angle of item 34 and the angle of induction 24 relative to sorter 12 or 14 are not fixed and will be the angles most appropriate to reducing product damage and for maximizing product discharge integrity during the specific sorting process.

In order to aid the operator in placement of the article, markings can be provided on the reversing buffer belt 20 if so desired. Alternatively, a laser or light 36 can be shown on the belt 20 in order to indicate the optimal angle at which the article should be placed. While only a single laser 36 is indicated by dotted lines in FIG. 1, a plurality of lights or lasers offset by 90 degrees can be used in order to precisely orient the article. In addition, the location for both sides of the article could be demarcated with one or more lasers or lights, if so desired.

In FIG. 2, an opening 38 is schematically shown for the laser 36. Similarly, openings 40 and 42 are indicated along the path for the article 34. When the laser or light beam from opening 40 is broken by an article passing from the reversing buffer belt 20 to the coding belt 28, the control system will determine that the item is moving from the input station 16. When this laser or light beam is no longer interrupted, the control system will then know that the input station 16 is ready to receive another article. Also, an opening 42 can be provided for a downstream laser or light source in order to detect passage of the article from the coding belt 28 to the induction station 30. As many lasers, photodetectors or other suitable sensors can be used throughout the system as needed and desired.

In conventional systems, when feeding articles to an induction system, it has been necessary to presort the articles. Generally, articles are fed along a conveyor to a designated input station where a user will load the station. Presorting is conventionally necessary in order to send a designated number of articles to any given input station. This presorting increases the handling of articles thereby increasing the potential for damage to the articles. Moreover, additional manpower and other resources are consumed during this presorting step. With the present invention, non-presorted articles can be fed to the input station 16. The operator 18 will use scanner 22 to input information to the control system concerning the article. Then the operator will simply place the article on the reversing buffer belt 20. The control system will know to which sorter the article is to be assigned, and will activate buffer belt 20 in the required direction to activate the appropriate induction section 24 to either sorter 12 or 14. This automatic sortation by the compound induction system 10 of the present invention avoids the need for presorting. In addition, potential damage and labor cost can be reduced.

It is noted that the reversing buffer belt 20 will normally be stationary when articles are placed thereon. It is not until the light screen 26 or other sensor indicates that the operator has moved out of the way and the items placed on the station 16 that the belt 20 will be activated. Because this belt 20 is stationary, this also helps to reduce possible damage to the articles. In conventional systems, when feeding articles to moving belts, damage to the article can occur.

The present invention therefore provides an efficient compound induction system which can be used with one or more tilt tray sorter(s) or any other suitable material handling system. The need for presorting can be avoided and labor cost can be reduced. Moreover, the potential for damage to the product can be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A compound induction system comprising:
   an input station;
   a plurality of downstream feeding section operatively connected to the input station; and
   a plurality of receives, each feeding section being associated with one of the receivers whereby articles placed on the input station can be fed to a selected receiving unit through one of the feeding sections, the receivers being downstream of the feedinq sections and the receivers being movable relative to the feeding sections, an end of the feeding sections adjacent the receivers being angled to match a direction to movement of the receivers so that articles transferred to the receives while the receivers are moving remain in a predetermined orientation.

2. A method for feeding at least two flows of articles to a plurality of receivers, the method comprising the steps of:

placing articles in an input station;

identifying a destination for articles in the input station;

automatically moving articles in one of at least two directions from the input station based on identification of the destination; and delivering articles from the input station to a selected one of the plurality of receivers, wherein the receivers include at least one sorting conveyor with a plurality of locations thereon, the locations on the at least one sorting conveyor being moved with the conveyor to pass adjacent the input station and wherein the step of identifying includes determining a particular location on the at least one sorting conveyor to which a selected article is to be delivered and wherein the step of moving includes moving the article to the particular location, and wherein the plurality of locations on the at least one sorting conveyor include a plurality of trays and wherein the method includes the step of timing movement of the article from the input station to coincide with arrival of a particular tray adjacent the input station so that the selected article is placed onto the moving tray during the step of delivering.

3. The method according to claim 2, wherein input station has an output in each of the directions in which the articles are moved such that there are two outputs and wherein method further comprises moving the at least one sorting conveyor past both of the outputs.

4. The method according to claim 2, wherein the trays of the at least one sorting conveyor are tilted trays and wherein the step of delivering includes placing the articles on the tilted trays.

* * * * *